United States Patent [19]
Kawamata et al.

[11] Patent Number: 6,129,979
[45] Date of Patent: Oct. 10, 2000

[54] MAGNETIC RECORDING MEDIUM

[75] Inventors: Toshio Kawamata; Tatsuo Ishikawa, both of Kanagawa, Japan

[73] Assignee: Fuji Photo Film Co., Ltd., Japan

[21] Appl. No.: 09/140,159

[22] Filed: Aug. 26, 1998

[30] Foreign Application Priority Data

Aug. 27, 1997 [JP] Japan .................................. 9-246160

[51] Int. Cl.⁷ ............................. G11B 5/738; G11B 5/735

[52] U.S. Cl. .......................... 428/216; 428/328; 428/336; 428/423.5; 428/425.9; 428/424.4; 428/475.2; 428/532; 428/694 BG; 428/694 BS; 428/694 SL; 428/900

[58] Field of Search ...................... 428/216, 328, 428/336, 423.5, 425.9, 474.4, 475.2, 532, 694 BG, 694 BS, 694 SL, 900

[56] References Cited

U.S. PATENT DOCUMENTS

| | | | |
|---|---|---|---|
| 4,795,672 | 1/1989 | Takeda et al. | 428/216 |
| 5,645,918 | 7/1997 | Ito et al. | 428/141 |

*Primary Examiner*—Stevan A. Resan
*Attorney, Agent, or Firm*—Brinks Hofer Gilson & Lione; G. Peter Nichols

[57] ABSTRACT

A magnetic recording medium composed of an aromatic polyamide support, a magnetic recording layer arranged on one surface side of the support, and a back-coating layer arranged on the other surface side of the support is improved in its running durability, by forming the back-coating layer from solid particles and a binder in amounts of the range of 8/10 to 20/10, and further by placing a subbing layer of polyester resin or polyurethane resin having a Tg of 40° C.–80° C. and a polar group such as $-SO_3M$, $-OSO_3M$, $-COOM$ and $-OPO_3MM^1$ (each of M and $M^1$ is hydrogen, an alkaline metal ion or an ammonium ion) between the support and the back-coating layer.

26 Claims, No Drawings

MAGNETIC RECORDING MEDIUM

FIELD OF THE INVENTION

This invention relates to a magnetic recording medium preferably employed as a magnetic recording tape for computer data storage.

BACKGROUND OF THE INVENTION

Recently, small-sized computers such as mini computers and personal computers have been widely employed, and hence it has become very important to store computer data with high security. Magnetic recording tapes which are named "back-up tapes" have been employed for this purpose. The magnetic recording tapes must have not only great storage capacity but also high running endurance. Further, it is also needed for the magnetic recording tapes to store the data without failure even under severe environmental conditions (for example, drastic variations of temperature and/or humidity).

The back-up tape generally comprises a non-magnetic flexible plastic web (i.e., support) and a magnetic recording layer provided thereon. In order to increase recording density (data storage capacity per unit area), a non-magnetic layer and a thin magnetic layer may be provided on the non-magnetic support web in order.

The magnetic recording layer preferably has a smooth surface in consideration of electromagnetic characteristics, but the smooth surface sometimes causes troubles such as wrong tape winding and jerky running. For obviating these troubles, a back-coating layer is generally provided on the back surface of the support web, that is, on the surface of the support opposite to the surface on which the magnetic recording layer is provided.

Japanese Patent Provisional Publication No. H5(1993)-182178 discloses a magnetic recording tape in which a non-magnetic layer and a thin magnetic layer are provided on one surface of a non-magnetic support web in order, and a back-coating layer is provided on the other surface. As material for the non-magnetic support web, the publication suggests aromatic polyamide such as aramide.

Japanese Patent provisional Publication No. H9(1997)-115134 proposes a magnetic recording tape having an improved back-coating layer provided on the back surface of the support web. The improved back-coating layer comprises a binder and particles dispersed therein, and the particles are two kinds of carbon black (which have mean particle size differing from each other), a calcium carbonate powder having a specific particle size, and other inorganic material powders having a specific particle size and a Mohs' scale of hardness of 5 to 9. According to the publication, the back-coating layer gives high running endurance to the magnetic recording tape, and hence the proposed tape is very suitable for storing computer data.

The back-up tapes have been getting thinner to increase storage capacity, and accordingly a support web of the tape has been needed to have a higher rigidity. As material for the rigid support web, aromatic polyamide (i.e., aramide) is considered to be suitable. The present inventors, however, have noted that a back-coating layer shows unsatisfactory adhesion to the aromatic polyamide support web, and consequently that various troubles are liable to occur while the recording tape is repeatedly run in contact with a magnetic head and guide pins of recording/reproducing device. For example, the edge of the recording tape is often damaged upon repeated contact with the magnetic head and/or the guide pins, and further wastes coming from damaged recording tape sometimes increase friction of the tape.

Accordingly, it is an object of the present invention to provide a magnetic recording medium in which a back-coating layer adheres well to an aromatic polyamide support so that the damage of edge of the tape is obviated if the tape repeatedly runs in recording/reproducing devices. The magnetic recording medium of the invention is preferably employed as a magnetic recording tape for computer data storage.

SUMMARY OF THE INVENTION

The inventors have studied so as to improve adhesion between an aromatic polyamide support web and a back-coating layer comprising solid particles, and found that provision of a subbing layer of specific material between the support and the back-coating layer is effective to improve running durability. In more detail, according to the study of the inventors, the subbing layer of polyester resin or polyurethane resin having a specific polar group advantageously enhances the adhesion between the support and the back-coating layer.

The inventors also have studied about destruction mechanism of the magnetic recording tape, and found the following facts.

If the adhesion is strong, the destruction is caused by aggregation failure in the back-coating layer. In that case, the back-coating layer is destroyed and a piece of the destroyed layer remains on the support. If the adhesion is too weak, however, the destruction is caused by interfacial failure between the support and the subbing layer or between the subbing layer and the back-coating layer. In either case, the back-coating layer separates from the support and does not remain on the support. Therefore, when the increase of adhesion between the support and the back-coating layer is considered, it is very important to balance the adhesion between the support and the subbing layer with that between the subbing layer and the back-coating layer. From the point of view, the back-coating layer preferably contains a binder resin having the same polar group as that of the subbing layer, because the binder resin having the polar group effectively keeps the back-coating layer from the interfacial failure.

The inventors have discovered that the polyester resin or polyurethane resin in the subbing layer must have a glass transition temperature (Tg) of 40° C. to 80° C. for the following reasons.

In the process for preparation of the magnetic recording tape, the subbing layer is formed by applying a coating solution onto the back surface of the support web. In order to prepare the coating solution, the resin must be soluble in a solvent. After the subbing layer is formed, the coated support web is once rolled, and then the back-coating layer is formed by applying a coating dispersion onto the subbing layer, and thus coated support web is rolled and stored. During these storage periods in the form of a roll, it is needed for the support web not to cause blocking (not to be fixed each other). In consideration of the preparation process, the resin for the subbing layer of the invention must have a glass transition temperature (Tg) in the above range because a resin having a higher glass transition temperature does not have solubility enough to prepare the coating solution and a resin of a lower glass transition temperature exhibits troublesome blocking characteristics.

Accordingly, the present invention resides in a magnetic recording medium comprising a support of aromatic polyamide, a magnetic recording layer which comprises a ferromagnetic powder and a binder an, which is arranged on one surface side of the support, and a back-coating layer which is arranged on the other surface side of the support, wherein the back-coating layer comprises solid particles and a binder in amounts of the range of 8/10 to 20/10, in terms of the former/latter, and a subbing layer which comprises polyester resin or polyurethane resin having a glass transition temperature of 40° C. to 80° C. and at least one polar group selected from the group consisting of —SO$_3$M, —OSO$_3$M, —COOM and —OPO$_3$MM$^1$ in which each of M and M$^1$ independently is a hydrogen atom, an alkaline metal ion or an ammonium ion, is arranged between the support and the back-coating layer.

The preferred embodiments of the invention are as follows.

(1) The binder in the back-coating layer comprises at least one resin selected from the group consisting of nitrocellulose resin, polyurethane resin and phenoxy resin.

(2) The binder in the back-coating layer comprises a resin having the same polar group as the binder resin of the subbing layer.

(3) The subbing layer has a thickness of 0.01 to 0.3 µm, preferably 0.01 to 0.1 µm.

(4) The solid particles in the back-coating layer comprises a carbon black, an inorganic material powder I having Mohs' scale of hardness of 3 to 4.5, and an inorganic material powder II having Mohs' scale of hardness of 5 to 9.

(5) In the above (4), the carbon black comprises a carbon black I having a mean particle size of 10 to 20 mµ and a carbon black II having a mean particle size of 230 to 300 mµ, the inorganic material powder I has a mean particle size of 30 to 50 mµ, and the inorganic material powder II has a mean particle size of 80 to 250 mµ.

(6) In the above (4) or (5), the inorganic material powder I is calcium carbonate.

(7) In the above (4) or (5), the inorganic material powder II is α-iron oxide or α-alumina.

(8) A non-magnetic undercoating layer which comprises a non-magnetic powder and a binder and which is essentially non-magnetic, is further arranged between the support and the magnetic recording layer (9) The magnetic recording medium is a magnetic recording tape for computer data storage.

DETAILED DESCRIPTION OF THE INVENTION

The magnetic recording medium (hereinafter, often referred to as "magnetic recording tape") of the invention is characterized by the a subbing layer which is placed between the polyamide support and the back-coating layer and comprises a specific polyester or polyurethane resin. The resin has at least one polar group described below and its glass transition temperature (Tg) is in the range of 40° C. to 80° C.

Each component or material of the magnetic recording medium of the invention is explained below.

The support of the invention is made of aromatic polyamide which preferably contains the following repeating unit (I) or (II):

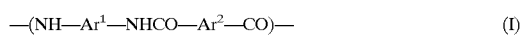

In the above formulas, each of Ar$^1$, Ar$^2$ and Ar$^3$ independently represents an aromatic ring (which may be condensed) or a group having at least one aromatic ring. Examples of Ar$^1$, Ar$^2$ and Ar$^3$ include

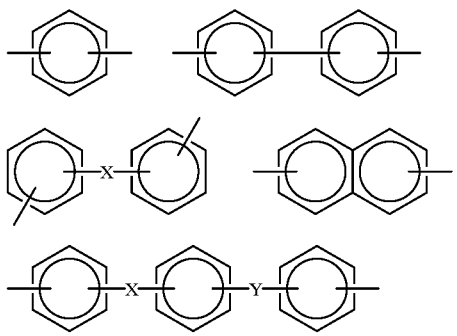

in which each of X and Y independently stands for —O—, —CH$_2$—, —CO—, —SO$_2$—, —S—, or —C(CH$_3$)$_2$—. The hydrogen atoms in the above aromatic rings may be substituted. Examples of the substituting groups include a halogen atom (preferably, chlorine atom), nitro group, an alkyl group having 1–3 carbon atoms (preferably, methyl), and an alkoxy group having 1–3 carbon atoms. The hydrogen atom of the amide bonding may be also substituted.

In a preferred aromatic polyamide, more than 50% (preferably more than 70%) of aromatic rings (preferably, benzene rings) are connected at the para-positions. It is also preferred that hydrogen atoms in more than 30% of the aromatic rings be substituted with halogen atoms (particularly, chlorine atoms) so as to reduce hygroscopicity. The preferred aromatic polyamides are described in Japanese Patent Provisional Publications No. H8(1996)-55327 and No. H8(1996)-55328. In the present invention, aramide is particularly preferred. Examples of commercially available aromatic polyamides include MICTORON (trade name, available from Toray Industries Inc.) and ARAMICA (trade name, available from Asahi Chemical Industry Co., Ltd.).

The aromatic polyamide support of the invention generally has a thickness of 1.0 to 10 µm, preferably 2.0 to 6.0 µm, more preferably 3.0 to 5.0 µm.

The polyester resin employable for the preparation of the subbing layer can be synthesized from an alcohol and a dibasic acid. Examples of the alcohols include ethylene glycol, diethylene glycol, triethylene glycol and tetraethylene glycol. Examples of the dibasic acids include aromatic dicarboxylic acids such as phthalic acid, isophthalic acid and terephthalic acid. If a phthalic acid having a polar group is used, the polyester resin having the polar group is easily prepared. The polar group is selected from —SO$_3$M, —OSO$_3$M, —COOM, and —OPO$_3$MM$^1$ in which each of M and M$^1$ independently is hydrogen atom, alkaline metal ion, or ammonium ion. Preferred are —SO$_3$Na and —COONa.

The polyurethane resin employable for the subbing layer can be synthesized from a diol compound and a diisocyanate compound. As the diol component, polyesterdiol prepared from a diol compound and a dibasic acid is employable. If the diol compound or the dibasic acid contains the polar group, the polyesterdiol having the polar group is easily prepared and thus the polyurethane resin having the polar group is easily obtained. Examples of the dibasic acids containing the polar group include 5-sulfoisophthalic acid, 2-sulfoisophthalic acid, 4-sulfophthalic acid, 3-sulfophthalic acid, dialkyl 5-sulfoisophthalate, dialkyl 2-sulfophthalate, alkyl 4-sulfophthalate, alkyl 3-sulfophthalate, dimethylol propionate, and sodium salts or potassium salts of the above.

In each of the polyester resin and the polyurethane resin, the content of the polar group preferably is in the range of 0.1 to 3 mmol/g. Each resin preferably has a weight average molecular weight of 10,000 to 100,000, more preferably 30,000 to 60,000. If the content of the polar group or the weight average molecular weight is beyond the above range, the resultant resin may have poor solubility. The alcohol and the dibasic acid are selected so that the resultant resin may have a glass transition temperature (Tg) of 40° C. to 80° C., preferably 60° C. to 80° C.

The polyester resin and the polyurethane resin can be used singly or in combination, and further they can be used in combination with other auxiliary resins such as thermoplastic resin, thermosetting resin, reactive resin, and mixture of them.

Examples of the thermoplastic resins include homopolymers or copolymers of vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinylbutyral, vinylacetal, and vinyl ether. Concrete examples of the copolymers include vinyl chloride-vinyl acetate copolymer, vinyl chloride-vinylidene chloride copolymer, vinyl chloride-acrylonitrile copolyrnmr, acrylic ester-acrylonitrile copolymer, acrylic ester-vinylidene chloride copolymer, acrylic ester-styrene copolymer, methacrylic ester-acrylonitrile copolymer, methacrylic ester-vinylidene chloride copolymer, methacrylic ester-styrene copolymer, vinylidene chloride-acrylonitrile copolymer, butadiene-acrylonitrile copolymer, styrene-butadiene copolymer, and chlorovinyl ether-acrylic ester copolymer.

The examrples of the thermoplastic resins further include polyamide resin, phenoxy resin, cellulose resins (e.g., cellulose acetate butyrate, cellulose acetate propionate, cellulose diacetate, cellulose propionate, nitrocellulose), polyvinyl fluoride, polyester or polyurethane which does not have the above-mentioned polar group, and various elastomer resins such as butadiene-acrylonitrile copolymer.

Examples of the thermosetting resins and the reactive resins include phenol resin, epoxy resin, polyurethane setting resin, urea resin, melamine resin, alkyd resin, acrylic reactive resin, formaldehyde resin, silicone resin, and epoxy-polyamide resin.

In the case that the auxiliary resins are used for forming the subbing layer, the content of the polyester resin or the polyurethane resin having the above specific polar group preferably is in the range of 40 to 90 wt. % based on the total weight of the subbing layer.

The binder of the subbing layer may be hardened by a hardening agent such as a polyisocyanate compound. Examples of the polyisocyanate compounds include tolylenediisocyanate, a reaction product of xylylenediisocyanate (3 mol) and trimethylolpropane (1 mol), and polymethylenepolyphenylisocyanates. When the hardening agent is used, the weight ratio of the resin to the agent preferably is in the range of 9/1 to 5/5.

The resin and other components are dissolved in an organic solvent to prepare a coating solution for the preparation of the subbing layer. Examples of the organic solvents include ketones (e.g., methyl ethyl ketone, methyl isobutyl ketone, cyclohexanone), tetrahydrofuran, methyl cellosolve, basic hydrocarbons (e.g., methylene chloride, ethylene chloride, chloroform, ethylene chlorohydrin). Preferred are cyclohexanone, methyl ethyl ketone, methyl isobutyl ketone and a mixture of them.

The subbing layer may contain other additives such as pigments (e.g., carbon black, nigrosine) and surface active agents for the purpose of, for example, antistatic treatment.

The subbing layer for the back-coating layer can be formed by the steps of dissolving the resin and other components in the solvent to prepare a coating solution, and applying the solution onto the back surface of the aromatic polyamide support by known coating methods. The thickness of the subbing layer preferably is in the range of 0.01 to 0.3 μm, more preferably 0.01 to 0.1 μm.

In the case that the magnetic recording medium of the invention is employed as a magnetic recording tape for computer data storage, the medium must have much stronger running endurance or durability than those of video tapes and audio tapes. In order to ensure high running endurance, the back-coating layer preferably comprises solid particles and a binder so that the weight ratio of said binder to said particles may be included in the range of 8/10 to 20/10. The particles preferably comprises carbon black, an inorganic material powder having Mohs' scale of hardness of 3 to 4.5 (referred to as inorganic material powder I) and an inorganic material powder II having Mohs' scale of hardness of 5 to 9 (referred to as inorganic material powder II).

With respect to each of the carbon black, the inorganic material powder I and the inorganic material powder II, detailed explanations are described below.

The carbon black preferably comprises a combination of two kinds of carbon blacks having different mean particle sizes (i.e., diameters). One carbon black comprises relatively fine particles having a mean particle size of 10 to 20 mμ (referred to as carbon black I), and the other comprises relatively crude particles having a mean particle size of 230 to 300 mμ (referred to as carbon black II). The carbon black I having such a relatively small particle size imparts to the back-coating layer a low surface electric resistance and a low light transmittance. The low light transmittance may be advantageous for the use in a magnetic recording device which works upon detection of light transmittance of running magnetic recording tape therein. Moreover, the carbon black I having such a relatively small particle size can reduce a friction coefficient efficiently when it is employed in combination with a liquid lubricant, because the carbon black I having the small particle size can well retain the liquid lubricant on its surface.

The carbon black II having a relatively large particles size can serve as solid lubricant and further form a protrusion of a small size on the surface of the back-coating layer. Such small size protrusion can reduce the total contact area between the back-coating layer and the support members (for instance, guide poles) of the recording device. The reduced contact area results in reducing the friction coefficient between the back-coating layer and the support members.

Examples of commercially available carbon black I include RAVEN 2000B (mean particle size: 18 mμ) and RAVEN 1500B (17 mμ)[trade names, available from Columbia Carbon Corp.]; BLACK PEARLS 800 (17 mμ) [trade name, available from Cabot Corp.]; PRINTEX 90 (14 mμ), PRINTEX 95 (15 mμ), PRINTEX 85 (16 mμ) and PRINTEX 75 (17 mμ)[trade names, available from Degussa Corp.]; and #3950 (16 mμ)[trade name, available from Mitsubishi Chemicals Co., Ltd.]. Examples of commercially available carbon black II having a relatively large particle size include THERMAL BLACK (270 mμ)[available from Cancarp Corp.] and RAVEN MTP (275 mμ)[available from Columbia Carbon Corp.].

The ratio of carbon black I/carbon black II preferably is 98/2 to 75/25, by weight, more preferably 95/5 to 85/15. The total amount of carbon black(s) generally is in the range of 30 to 80 weight parts, preferably 45 to 65 weight parts, based on 100 weight parts of the binder polymer of the back-coating layer.

The back-coating layer preferably contains two kinds of inorganic material powders, that is, an inorganic material powder I having Mohs' scale of hardness of 3 to 4.5 and an inorganic material powder II having Mohs' scale of hardness of 5 to 9. The inorganic material powder I preferably has a mean particle size of 30 to 50 mµ, while the inorganic material powder II preferably has a mean particle size of 80 to 250 mµ, more preferably 100 to 210 mµ.

The inorganic material powder I stabilizes the friction coefficient of the medium repeatedly used, and further it does not damage the guide pole with which the medium runs in contact. Examples of the inorganic material powder I include calcium sulfate, calcium carbonate, calcium silicate, barium sulfate, magnesium carbonate, zinc carbonate and zinc oxide. Calcium carbonate is most preferred. The above compounds may be used singly or in combination with two or more. The amount of the inorganic material powder I is preferably in the range of 10 to 140 weight parts, more preferably 35 to 100 weight parts, based on 100 weight parts of the carbon black.

The inorganic material powder II enhances durability of the back-coating layer, and thus improves running endurance of the magnetic recording tape of the invention. By adding the inorganic material powder II together with the carbon black and the inorganic material powder I, the back-coating layer is reinforced in its physical strength enough to reduce deterioration caused by repeating runs. Further, the guide poles are polished with the inorganic material powder II, and consequently the wastes on the poles are reduced. A combination of the inorganic material powder I (particularly, calcium carbonate) and the inorganic material powder II makes the tape run smoothly in contact with a rough surface of the guide pole, and accordingly the friction is reduced and stabilized.

Examples of the inorganic material powder II include α-iron oxide, α-alumina and chromium oxide ($Cr_2O_3$). Among them, α-iron oxide and α-alumina are preferred. The above compounds may be used singly or in combination. The amount of the inorganic material powder II preferably is in the range of 3 to 30 weight parts, more preferably 3 to 20 weight parts, based on 100 weight parts of the carbon black. The inorganic material powder I preferably differs from the inorganic material powder II in the Mohs' scale of hardness by at least 2.0 (more preferably at least 2.5, most preferably at least 3.0).

The back-coating layer preferably contains the above two kinds of inorganic material powders (i.e., the inorganic material powders I and II) each of which has the above-mentioned specific hardness an, mean particle size, and the carbon black comprising the above two kinds of carbon blacks (i.e., relatively fine carbon black and relatively crude one) which have different mean particle sizes. The inorganic material powder I preferably is calcium carbonate. The weight ratio of the total inorganic material powder to the total carbon black preferably is in the range of 70/30 to 30/70, more preferably 65/35 to 35/65.

The back-coating layer may contain a lubricant. Examples of the lubricants employable in the back-coating layer are those described for the incorporation into the magnetic recording layer described after. The amount of the lubricant is usually in the range of 1 to 5 weight parts based on 100 weight parts of the binder.

As the binder of the back-coating layer, known resins are employable. Examples of the resins include vinyl chloride copolymer, vinylidene chloride copolymer, polyester resin, acrylic resin, polyvinyl acetal resin, polyvinyl butyral resin, phenoxy resin, epoxy resin, butadiene-acrylonitrile copolymer, polyurethane resin, urethane epoxy resin, and nitrocellulose resin. Preferred are polyurethane resin (more preferably polyester polyurethane resin), nitrocellulose resin and phenoxy resin. The above resins may be used singly or in combination. The binder of the back-coating layer preferably contains a resin having the same polar group as the binder of the subbing layer has.

The back-coating layer comprises the binder and the solid fine particles (i.e., the carbon black, the inorganic material powder I, and the inorganic material powder II), and the weight ratio of the binder to the solid fine particles is in the range of 8/10 to 20/10. If the ratio is below 8/10, the solid particles are not well combined so that they come off easily while the tape is running, and consequently the medium exhibits poor running endurance. If the ratio is above 20/10, the friction coefficient of the back-coating layer increases too much, and accordingly the tape cannot run smoothly. The back-coating layer usually has a thickness of 0.1 to 1.5 µm, preferably 0.2 to 1.0 µm, and more preferably 0.3 to 1.0 µm.

Surface condition of the back-coating layer is often copied onto that of the magnetic recording layer, while the tape is stored in the form of a roll. For example, if the back-coating layer has a rough surface, the roughness is copied onto the surface of the magnetic recording layer and accordingly the medium exhibits unfavorable reproducing characteristics. In contrast, if the surface of the back-coating layer is too smooth, the friction increases to cause increased drop-out errors. The back-coating layer preferably has a surface roughness (i.e., Ra value, center-line average roughness, cut-off at 0.08 mm) in the range of 3 to 60 nm. The adjustment of the surface roughness can be done by appropriately adjusting the calendaring conditions adopted in the calendaring process. The adjustment of the calendaring conditions can be done by choosing appropriate material and surface roughness of the calendar roll and the calendaring pressure.

The medium of the invention comprises an aromatic polyamide support, a subbing layer made of the specific resin and a back-coating layer provided on one surface side of the support in order, and a magnetic recording layer provided on the other surface side of the support. Preferably, the medium further comprises a non-magnetic undercoating layer provided between the support and the magnetic recording layer.

The following is detailed description about the magnetic recording layer.

The magnetic recording layer comprises a ferromagnetic powder and a binder. The layer may further comprise a lubricant, an electroconductive carbon black, and an abrasive.

Examples of the ferromagnetic powders include ferromagnetic iron oxide, ferromagnetic iron oxide containing cobalt, ferromagnetic chromium dioxide powder, ferromagnetic alloy powder, barium ferrite, ferromagnetic iron carbide, and ferromagnetic iron nitride. Particularly preferred is a ferromagnetic alloy powder.

The ferromagnetic alloy powder is, for example, a powder comprising Fe, Co, or Ni in which metal component is contained in an amount of more than 75 wt. % based on the total weight, and more than 80 wt. % of said metal component is ferromagnetic metal (e.g., Fe, Co, Ni, Fe—Ni, Co—Ni, Fe—Co—Ni) and less than 20 wt. % of said metal component is other element (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P). The ferromagnetic alloy powder preferably contains Al and/or Si, and further the powder may contain water, hydroxide, or oxide in a very small amount.

The particle shape of the ferromagnetic alloy powder is not particularly restricted, but usually needle shape, droplet shape, spherical shape, cubic shape, foot-ball shape or plate shape. Since metal particles are rapidly oxidized by air, the powder is preferably subjected to oxidation-resisting treatment for coating the surface of the particles with oxides. The oxidation-resisting treatment comprises, for example, the steps of soaking the metal powder in an organic solvent under an atmosphere of inert gas, and evaporating the solvent in air. The treatment can be also carried out by the steps of placing the metal power in an inert gas atmosphere, introducing therein a mixed gas of oxygen and the inert gas, gradually increasing the partial pressure of oxygen in the mixed gas, and finally replace the mixed gas with air.

The ferromagnetic alloy powder preferably has a coercive force (Hc) of 600 to 5,000 Oe, more preferably 1,500 to 3,000 Oe. The powder also preferably has a saturation magnetization (σs: saturation magnetic flux density) of not less than 110 emu/g, more preferably of 120 to 170 emu/g. The length of longitudinal axis of the powder (i.e., mean particle size) preferably is not longer than 0.25 $\mu$m, more preferably in the range of 0.01 to 0.25 $\mu$m, and the axial ratio (i.e., aspect ratio: longitudinal axis/length of width axis) preferably is not more than 10, and more preferably in the range of 5 to 10. If the values are out of the above ranges, noises are enhanced and hence the resultant medium gives signals with poor C/N.

A lubricant can be incorporated into the magnetic recording layer so that it can come out onto the surface of the recording layer. The lubricant can reduce friction to maintain smooth contact between the surface of the recording layer and a magnetic head. Examples of the lubricants include silicone oil, fatty acid modified silicone oil, graphite, alcohol fluoride, polyolefin (e.g., polyethylene wax), polyglycol (e.g., polyethyleneoxide wax), tetrafluoroethylene oxide wax, polytetrafluoro-glycol, perfluoro-fatty acid, perfluoro-fatty acid ester, perfluoro-alkyl sulfate ester, perfluoro-alkyl phosphate ester, polyphenyl ether, fatty acid, fatty acid ester, fatty acid amide and fatty acid alcohol. Preferred are a fatty acid and a fatty acid ester.

Examples of the fatty acids employable as lubricant include caprylic acid, undecylic acid, lauric acid, myristic acid, palmitic acid, stearic acid, behenic acid, montanic acid, oleic acid, elaidic acid, linolic acid, linolenic acid, and stearolic acid.

Examples of the fatty acid esters employable as lubricant include butyl myristate, methyl myristate, butyl stearate, ethyl palmitate, butoxyethyl palpitate, and butoxyethyl stearate. The above fatty acids and fatty acid esters may be employed singly or in combination.

The lubricant can be generally incorporated into the magnetic recording layer in an amount of 0.1 to 20 weight parts, preferably 0.5 to 10 weight parts, based on 100 weight parts of the ferromagnetic powder. In the case that a fatty acid or a fatty acid ester is employed as the lubricant, the amount generally is in the range of 0.1 to 5 weight parts, preferably 0.3 to 4 weight parts, based on 100 weight parts of the ferromagnetic powder. If a fatty acid and a fatty acid ester are employed in combination, the ratio between the fatty acid and the fatty acid ester preferably is in the range of 1:9 to 9:1 by weight.

The carbon black can be generally incorporated into the magnetic recording layer so that the recording layer can have a low surface electric resistance (Rs), a small kinetic friction coefficient ($\mu_k$ value), good running endurance and smooth surface. The carbon black preferably has a mean particle size (i.e., diameter) of 5 to 350 m$\mu$ (more preferably 10 to 300 m$\mu$), and a specific surface area of 5 to 500 m$^2$/g (more preferably 50 to 300 m$^2$/g). Further, the carbon black shows a DBP (dibutyl phthalate) oil absorption in the range of 10 to 1,000 mL/100 g (more preferably 50 to 300 mL/100 g), pH of 2 to 10, a water content of 0.1 to 10%, and a tap density of 0.1 to 1 g/cc.

The carbon black can be those produced by various processes. For instance, furnace black, thermal black, acetylene black, channel black, and lamp black can be employed.

The carbon black can be generally incorporated into the magnetic recording layer in an amount of 0.1 to 30 weight parts, preferably 0.2 to 15 weight parts, based on 100 weight parts of the ferromagnetic powder.

The abrasive generally has a Mohs' scale of hardness of not less than 5 (preferably not lass than 6, more preferably not less than 8), and preferably has a mean particle size (i.e., diameter) of 0.05 to 1 $\mu$m, more preferably 0.2 to 0.8 $\mu$m. Examples of the abrasives include $\alpha$-Al$_2$O$_3$. (Mohs' scale of hardness: 9), TiO (Mohs' scale of hardness: 6), TiO$_2$ (Mohs' scale of hardness: 6.5), SiO$_2$ (Mohs' scale of hardness: 7), SnO$_2$ (Mohs' scale of hardness: 6.5), Cr$_2$O$_3$ (Mohs' scale of hardness: 9), and $\alpha$-Fe$_2$O$_3$ (Mohs' scale of hardness: 5.5). The above abrasives may be employed singly or in combination. Preferred are $\alpha$-Al$_2$O$_3$ and Cr$_2$O$_3$. The abrasive can generally be incorporated into the magnetic recording layer in an amount of 0.1 to 25 weight parts, preferably 1 to 20 weight parts, and more preferably 1 to 15 weight parts, based on 100 weight parts of the ferromagnetic powder.

The binder employed for the magnetic recording layer can be optionally selected from those known for the incorporation into the subbing layer. Examples of the binders include vinyl chloride copolymers, vinylidene chloride copolymers, polyester resins, acrylic resins, polyvinyl acetal resins, polyvinyl butyral resins, phenoxy resins, epoxy resins, butadiene-acrylonitrile copolymer, polyurethane resins, and urethane-epoxy resins. These binder resins may be employed singly or in combination. The resin may have polar groups such as —SO$_3$M, —OSO$_3$M, —COOM and —OPO$_3$MM$^1$ in which each of M and M$^1$ independently is hydrogen atom, alkaline metal ion or ammonium ion.

It is particularly preferred for the magnetic recording layer to contain both polyurethane resin and vinyl chloride copolymer resin (having the repeating unit of vinyl chloride in an amount of 60 to 99 mol %). In this case, at least one of the resins preferably comprises a repeating unit having a polar group.

Examples of the polar groups contained in the vinyl chloride copolymer include —SO$_3$M, —OSO$_3$M, —COOM and —OPO$_3$MM$^1$ in which each of M and M$^1$ independently is hydrogen atom, alkaline metal ion or ammonium ion. The vinyl chloride copolymer may comprise the repeating unit having one of the above polar groups or that having two or more polar groups, and preferably it comprises a repeating unit having —SO$_3$Na and/or COONa. The content of the repeating unit having the polar group usually is in the range of 0.001 to 5.0 mol %, preferably 0.01 to 5.0 mol %, and more preferably 0.05 to 3.0 mol %.

It is also preferred that the vinyl chloride copolymer further comprises a repeating unit having an epoxy group, because the epoxy group stabilizes the resultant copolymer and inhibits desalting reaction which proceeds as time passes. The content of the repeating unit having epoxy group usually is in the range of 1 to 30 mol %, and its ratio to 1 mol of the repeating unit of vinyl chloride is in the range of 0.01 to 0.5 mol, preferably 0.01 to 0.3 mol.

The vinyl chloride copolymer preferably has a number average molecular weight of 10,000 to 200,000, preferably 10,000 to 100,000, more preferably 15,000 to 60,000.

The vinyl chloride copolymer having the above polar group can be synthesized in the know manner, from vinyl chloride monomer and a monomer having the polar group and a reactive double bond (e.g., 2-(meth)acrylamide-2-methylpropanesulfonic acid, vinylsulfonic acid or its alkali metal salt, (meth)acrylic acid-ethyl 2-sulfonate and its alkali metal salt, maleic acid, maleic anhydride, (meth)acrylic acid, and (meth)acrylic acid-2-phosphoric ester). In the case that epoxy group is introduced, glycidyl (meth)acrylate is usually employed as the monomer having an epoxy group and a reactive double bond.

The vinyl chloride copolymer having the polar group can be also prepared by the steps of synthesizing a vinyl chloride copolymer having a hydroxyl group, and introducing the polar group into the copolymer by deacidation reaction between the hydroxyl group and a compound having both the polar group and chlorine atom (e.g., monochloroacetic acid, epichlorohydrin for introducing epoxy group).

In the process for preparation of the vinyl chloride copolymer, other monomers may be incorporated unless they give unfavorable effect to the resultant copolymer. Examples of the monomers include vinyl ether, α-monoolefin, acrylic ester, unsaturated nitrile, aromatic vinyl, and vinyl ester. The vinyl chloride copolymer having the polar group is commercially available (e.g., MR-110 [trade name], available from Nippon Zeon Co., Ltd.).

Examples of the polar groups contained in the polyurethane resin include —$SO_3M$, —$OSO_3M$, —COOM and —$OPO_3MM^1$ in which each of M and $M^1$ independently is hydrogen atom, alkaline metal ion or ammonium ion. The polyurethane resin may comprise a repeating unit having one of the above polar groups or that having two or more polar groups, and preferably it comprises a repeating unit having —$SO_3Na$ and/or COONa. The content of the repeating unit having the polar group usually is in the range of 0.001 to 5.0 mol %, preferably 0.01 to 5.0 mol %, and more preferably 0.05 to 2.0 mol %.

The polyurethane resin having the polar group can be prepared in the same manner as described herein for the incorporation into the subbing layer. The polyurethane resin can be synthesized from a diol compound and a diisocyanate compound. As the diol component, polyesterdiol prepared from a diol compound and a dibasic acid is generally employed. For preparing the polyesterdiol, a known diol compound having no polar group and a known dibasic acid having no polar group are employable. The polyurethane resin having the polar group can be prepared by the steps of synthesizing a polyester diol having the polar group from a diol compound and a dibasic acid at least one of which has the polar group, and then making the polyester diol react with a diisocyanate compound. Examples of the diol compounds having the polar group and the dibasic acid having the polar group are those described herein for the subbing layer. The polyester diol having the polar group is synthesized so that it may have a number average molecular weight of 500 to 8,000. As the diisocyanate compound with which the polyester diol having the polar group reacts, known compounds are employable.

The polyurethane resin described above usually has a number average molecular weight of 10,000 to 200,000, preferably 10,000 to 100,000, more preferably 15,000 to 60,000.

The above-mentioned polyurethane resin can be also prepared by the steps of synthesizing a polyurethane resin having a hydroxyl group, and introducing the polar group into the resin by deacidation reaction between the hydroxyl group and a compound having both the polar group and chlorine atom (e.g., monochloroacetic acid).

The polyurethane resin having the polar group is commercially available (e.g., UR-4300, UR-8200, UR-8300, UR-8700, [trade names], available from Toyobo Co., Ltd.).

In the case that the vinyl chloride copolymer and the polyurethane resin are used in combination as a binder polymer, the mixing ratio of the vinyl chloride copolymer to the polyurethane resin usually is in the range of 35/65 to 80/20, preferably 40/60 to 70/30, by weight. The vinyl chloride copolymer and/or the polyurethane resin can make the ferromagnetic powder dispersed better than other binders, and therefore it is particularly preferred to use the vinyl chloride copolymer and the polyurethane resin in combination.

The binder employed for the magnetic recording layer is preferably hardened by a polyisocyanate compound. Examples of the polyisocyanate compounds include a reaction product of 3 mol of diisocyanate and 1 mol of trimethylolpropane (e.g., diphenylmethane-4,4'-diisocyanate, tolylenediisocyanate, xylylenediisocyanate), a biuret adduct compound of 3 mol of hexamethylene diisocyanate, an isocyanurate adduct compound of 3 mol of tolylene diisocyanate and 2 mol of hexamethylene diisocyanate, and a polymer of diphenylmethane diisocyanate. If the polyisocyanate compound is employed with a combination of the vinyl chloride copolymer and the polyurethane resin, the compound makes a three-dimensional cross-linkage between the copolymer and the polyurethane, and thereby a tough binder can be formed. In that case, the contents of the vinyl chloride copolymer, the polyurethane resin and the polyisocyanate compound preferably are in the ranges of 5 to 80 wt. %, 2 to 50 wt. %, and 2 to 50 wt. %, respectively, based on the total weight of the binder.

The total amount of the binder for the magnetic recording layer is usually in the range of 5 to 50 weight parts, preferably 10 to 30 weight parts, based on 100 weight parts of the ferromagnetic powder.

The magnetic recording layer may be formed on a beforehand provided undercoating layer. With respect to the undercoating layer provided between the magnetic recording layer and the support, various materials are reported. Japanese Patent Publications No. 47(1972)-22071 and No. 49(1974)-10243, and Japanese Patent Provisional Publications No. 52(1977)-42703 and No. 59(1984)-19230 propose components of the undercoating layer. In Japanese Patent Publication No. 62(1985)-37451 and Japanese Patent Provisional Publications No. 60(1985)-11358, No. 60(1985)-19522 and No. 61(1986)-2654510, polyester resin is incorporated into the undercoating layer so as to increase adhesion between the magnetic recording layer and a support made of polyethylene terephthalate. Japanese Patent Provisional Publication No. H1(1989)-245421 proposes a polyester resin having a particular structure for the undercoating layer. In Japanese Patent Publication No. 60(1985)-38767 and Japanese Patent Provisional Publication No. H7(1995)-29148, aqueous polyamide resin is incorporated into the undercoating layer which is provided between the magnetic recording layer and a support made of aromatic polyamide.

A dispersing agent may be added into the coating dispersion for preparing the magnetic recording layer and that for preparing the back-coating layer, so as to well disperse the ferromagnetic powder and the solid fine particles, respectively. Further, other additives such as plasticizer, anti-static agent (electroconductive fine particles other than carbon black) and antiseptic may be optionally incorporated into each layer.

Examples of the dispersing agents include a fatty acid having 12–18 carbon atoms (represented by RCOOH in which R is an alkyl group or alkenyl group of 11–17 carbon atoms) such as caprylic acid, capric acid, lauric acid, myristic acid, palmitic acid, stearic acid, behenic acid, oleic acid, elaidic acid, linoleic acid, linolenic acid and stearolic acid; metallic soap derived from the above fatty acid and alkaline metal or alkaline earth metal; fluorine-containing ester of the fatty acid; amide of the fatty acid; polyalkylene oxide alkylphosphate; lecithin; trialkylpolyolefinoxy quaternary ammonium salt (in which the alkyl group has 1–5 carbon atoms, and the olefin is, for example, ethylene or propylene); sulfate; and copper phthalocyanine. The above compounds may be employed singly or in combination.

The back-coating layer preferably contains copper oleate, copper phthalocyanine and barium sulfate in combination. The dispersing agent is added into each coating dispersion in an amount of 0.5 to 20 weight parts based on 100 weight parts of the binder.

Plural magnetic recording layers may be provided so as to improve both electromagnetic characteristics and running endurance of the resultant magnetic recording medium. In that case, the ferromagnetic powder used for each magnetic recording layer is determined according to the purpose. Preferably, an upper magnetic recording layer comprises ferromagnetic alloy powder and a lower layer comprises ferromagnetic iron oxide.

In the case that the magnetic recording tape of the invention has a single magnetic recording layer, the thickness of the magnetic recording layer generally is in the range of 0.2 to 3.0 $\mu$m, preferably 0.5 to 2.5 $\mu$m, more preferably 1.0 to 2.5 $\mu$m. The total thickness of the medium generally is in the range of 3.0 to 10.0 $\mu$m, preferably 4.0 to 7.0 $\mu$m.

Preferably, the magnetic recording medium of the invention has a non-magnetic undercoating layer between the aromatic polyamide support and the magnetic recording layer.

The following is a detailed description about the non-magnetic undercoating layer.

The non-magnetic undercoating layer comprises a non-magnetic powder and a binder, and is essentially non-magnetic. The layer may contain a small amount of a magnetic powder unless the magnetic property of the non-magnetic undercoating layer adversely affect the magnetic property of the magnetic recording layer arranged thereon. Usually, the non-magnetic undercoating layer further contains a lubricant.

Examples of the non-magnetic powers for the incorporation into the non-magnetic undercoating layer include non-magnetic inorganic material powder and carbon black.

The non-magnetic inorganic material powder preferably has Mohs' scale of hardness of 5 or more, more preferably 6 or more and can be α-alumina, β-alumina, γ-alumina, carbon silicate, chromium oxide, cerium oxide, α-iron oxide, corundum, silicon nitride, titanium carbide, titanium dioxide, silicon dioxide, boron nitride, zinc oxide, calcium carbonate, calcium sulfate, or barium sulfate. The non-magnetic inorganic material powder can be used singly or in combination. Preferred are titanium dioxide, α-alumina, α-iron oxide, and chromium oxide.

The non-magnetic inorganic material powder preferably has a particle size (namely, mean particle size) of 0.01 to 1.0 $\mu$m, more preferably 0.01 to 0.5 $\mu$m, specifically preferably 0.02 to 0.1 $\mu$m.

The carbon black imparts to the non-magnetic undercoating layer appropriate electroconductivity so as to keep the undercoating layer from static electricity and further improves smoothness of the surface of the magnetic recording layer arranged thereon. Examples of carbon blacks for incorporation into the non-magnetic undercoating layer are those described before for the magnetic recording layer. The particle size of carbon black for the non-magnetic undercoating layer preferably is not more than 35 m$\mu$, more preferably in the range of 10 to 35 m$\mu$.

The carbon black can be incorporated into the non-magnetic undercoating layer in an amount of 3 to 20 weight parts, preferably 4 to 18 weight parts, more preferably 5 to 15 weight parts, based on 100 weight parts of the total non-magnetic powder.

The non-magnetic undercoating layer may further contain a lubricant such as a fatty acid or a fatty acid ester. Examples of the lubricants employable for the incorporation into the non-magnetic undercoating layer are those described before for the magnetic recording layer. The lubricant can be employed in an amount of 0.2 to 20 weight parts based on 100 weight parts of the non-magnetic powder in the non-magnetic undercoating layer.

The binder resin described before for the magnetic recording layer can be also employed for the preparation of the non-magnetic undercoating layer. In particular, the vinyl chloride copolymer having the polar group and the polyurethane resin having the polar group are preferably employed in combination. The non-magnetic undercoating layer comprises the binder in an amount of 5 to 50 weight parts, preferably 10 to 30 weight parts, based on 100 weight parts of the non-magnetic powder in the non-magnetic undercoating layer. In the case that both vinyl chloride copolymer and polyurethane resin are employed, it is preferred to use a polyisocyanate compound in combination. In that case, the contents of the vinyl chloride copolymer, the polyurethane resin and the polyisocyanate compound are preferably in the ranges of 5 to 80 wt. %, 2 to 50 wt. %, and 2 to 50 wt. %, respectively, based on the total weight of the binder.

The non-magnetic undercoating layer may contain the optional components described before.

In the case that the magnetic recording medium is provided with the non-magnetic undercoating layer, the magnetic recording layer preferably has a thickness of 0.01 to 1.0 $\mu$m, more preferably 0.01 to 0.7 $\mu$m, most preferably 0.05 to 0.4 $\mu$m. The non-magnetic undercoating layer preferably has a thickness of 0.1 to 3.0 $\mu$m, more preferably 0.2 to 2.5 $\mu$m, specifically preferably 0.3 to 2.0 $\mu$m, most preferably 0.4 to 1.8 $\mu$m. The magnetic recording medium having the non-magnetic undercoating layer preferably generally has a total thickness of 3.0 to 8.0 $\mu$m, more preferably 4.0 to 7.5 $\mu$m.

The magnetic recording medium of the invention can be produced by the steps of forming the magnetic recording layer (and the non-magnetic undercoating layer, if desired) on one surface side of the support of aromatic polyamide, and then forming the subbing layer and the back-coating layer in this order on the other surface side.

The coating dispersion for preparing the magnetic recording layer (i.e., magnetic coating dispersion) can be prepared by the steps of adding the ferromagnetic powder and the binder (and if desired, the abrasive, carbon black, and the lubricant) into a solvent, and kneading the mixture well to disperse the components. Examples of the solvent include methyl ethyl ketone, toluene, butyl acetate, and cyclohexanone. The kneading method is not particularly restricted, and known methods are employable. The components can be added into the solvent in a desired order. For preparing the coating dispersion, known kneaders or mixers (e.g., roll mill, ball mill, sand grinder, attriter, high speed impeller dispersing machine, high speed stone mill, high speed impact mill, homogenizer, ultrasonic dispersing machine) are employable. Detailed descriptions about kneading and mixing are given in "Paint Flow and Pigment Dispersion" by T. C. Patton (John Wiley & Sons, 1964), "Kogyo Zairyo (Japanese)" pp. 25, 37(1977), and U.S. Pat. No. 2,581,414 and No. 2,855,515. The kneading methods described in the above publications are employable for the invention.

The coating dispersion for preparation of the non-magnetic undercoating layer and that for the back-coating layer can be also prepared in the same manner as described above.

Prior to applying the coating dispersion, the aromatic polyamide support may be subjected to surface treatments such as corona discharge treatment, plasma treatment, subbing treatment, heat treatment, dust removing treatment, metal deposition treatment., and alkali treatment.

In the case that the non-magnetic undercoating layer is not provided, the magnetic recording layer can be formed by applying the magnetic coating dispersion onto the aromatic polyamide support by means of a gravure roll coating machine, a blade coating machine or an extrusion coating machine.

On the other hand, for the preparation of the medium having the non-magnetic undercoating layer, the coating dispersion for the non-magnetic undercoating layer is applied onto the aromatic polyamide support in the same manner as described above to form the non-magnetic undercoating layer. After the formed non-magnetic undercoating layer is dried, the magnetic recording layer can be formed by applying the magnetic coating dispersion onto the non-magnetic undercoating layer by means of an extrusion coating machine of support pressing type. However, the magnetic recording layer is preferably formed on the non-magnetic undercoating layer by the known wet-on-wet process. The wet-on-wet process is performed by applying the magnetic coating dispersion onto the non-magnetic undercoating layer which is still wet, or by simultaneously coating a non-magnetic undercoating layer-coating dispersion and a magnetic recording layer-coating dispersion on the support.

A variety of procedures for conducting the wet-on-wet process are described in the following U.S. and Japanese patent publications:

1) U.S. Pat. No. 4,681,062, No. 4,480,583 and No. 5,302,206 for gravure coating, roller coating, blade coating, and extrusion coating;

2) U.S. Pat. No. 4,854,262, No. 5,030,484 and No. 5,302,206 for simultaneous coating by means of a coating device comprising two slits in a single coating head; and 3) Japanese Patent Provisional. Publication H2-174965 for simultaneous coating by means of an extrusion coating device equipped with a back-up roller.

For preparing the magnetic recording medium of the invention, the non-magnetic undercoating layer and the magnetic recording layer are preferably formed by simultaneous coating.

The magnetic recording layer thus prepared is, if desired, treated so that the ferromagnetic powder contained therein may be immediately dried and oriented in the desired direction. In this treatment, the aromatic polyamide support is conveyed at a speed of 10 to 1,000 m/minute and the temperature for drying is set at 20° C. to 130° C.

Each of the subbing layer and the back-coating layer can be formed in the same manner as described above for the magnetic recording layer and the non-magnetic undercoating layer. The process described above gives a multi-layered body comprising an aromatic polyamide support, a magnetic recording layer (and a non-magnetic undercoating layer, if desired) provided on one surface side of the support, and a subbing layer and a back-coating layer provided on the other surface side of the support. The thus prepared multi-layered body may be subjected to surface smoothing treatment. After that, the body is cut into pieces of a desired size.

The present invention is further described by the following examples and comparison examples. In these examples, "part(s)" means "part(s) by weight".

EXAMPLE 1

1) Coating dispersion for preparing non-magnetic undercoating layer

| | |
|---|---|
| Non-magnetic powder (titanium dioxide) (rutile type, TiO$_2$ content: higher than 90%, mean primary particle size: 0.035 μm, specific surface area (BET): 40 m$^2$/g, pH: 7.0 DBP (dibutyl phthalate) absorption: 27–38 g/100 g, Mohs' scale of hardness: 6.0 having a surface treated to form Al$_2$O$_3$) | 90 parts |
| Carbon black (available from Mitsubishi Carbon Co., Ltd., mean primary particle size: 16 μm, DBP absorption: 80 mL/100 g, pH: 8.0 specific surface area (BET): 250 m$^2$/g, volatile content: 1.5%) | 10 parts |
| Vinyl chloride copolymer having polar groups (—SO$_3$K, epoxy group) (MR-110, available from Nippon Zeon Co., Ltd.) | 12 parts |
| Polyester-polyurethane resin having polar group (—SO$_3$K) (neopentylglycol/caprolactone polyol/diphenylmethane-4,4'-diisocyanate (MDI) = 0.9/2.6/1, weight ratio, content of —SO$_3$Na group: 1 × 10$^{-4}$ mol/g) | 5 parts |
| Polyisocyanate (Colonate L, available from Nippon Polyurethane Industries, Ltd.) | 3 parts |
| Butoxyethyl stearate | 1 part |
| Stearic acid | 2 parts |
| Oleic acid | 1 part |
| Methyl ethyl ketone | 150 parts |
| Cyclohexanone | 50 parts |

All components of the above-identified compositions were kneaded in a continuous kneader and dispersed in a sand mill. The resulting dispersion was mixed with 2.5 parts of polyisocyanate (Colonate L) and 40 parts of butyl acetate. The mixture was passed through a filter having a mean pore size of 1 μm, to give a coating dispersion for preparing non-magnetic undercoating layer.

2) Coating dispersion for preparing magnetic recording layer

| | |
|---|---|
| Ferromagnetic metal powder (Fe-Ni) (Fe:Ni = 96:4; coercive force (Hc): 2,350 Oe; specific surface area (BET): 59 m$^2$/g; crystallite size: 170 angstroms; saturation magnetization (σs): 145 emu/g; grain size (mean diameter along the long axis): 0.07 μm; aspect ratio: 8.0; pH: 9.6; water soluble Na: 5 ppm; water soluble Ca: 2 ppm; water soluble Fe: 10 ppm) | 100 parts |

-continued

| | |
|---|---|
| Phenylphosphonic acid (for surface treatment) | 3 parts |
| Vinyl chloride copolymer having the polar groups (—$SO_3K$, epoxy group) (MR-110, available from Nippon Zeon Co., Ltd.; polymerization degree: 350; content of —$SO_3K$ group: $5 \times 10^{-6}$ mol/g; content of epoxy group: 3.5 wt. % in terms of monomer unit) | 10 parts |
| Polyester-polyurethane resin having the polar group (—$SO_3Na$) (neopentylglycol/caprolactone polyol/MDI = 0.9/2.6/1, weight ratio, content of —$SO_3Na$ group: $1 \times 10^{-4}$ mol/g) | 2.5 parts |
| Polyisocyanate (Colonate L, available from Nippon Polyurethane Industries, Ltd.) | 2.5 parts |
| α-Alumina (particle size: 0.3 μm) | 10 parts |
| Chromium oxide ($Cr_2O_3$) | 1 part |
| Carbon black (particle size: 0.10 μm) | 3 parts |
| Butyl stearate | 0.5 part |
| Butoxyethyl stearate | 0.5 part |
| Stearic acid | 2 parts |
| Oleic acid | 1 part |
| Methyl ethyl ketone | 150 parts |
| Cyclohexanone | 50 parts |

All ingredients of the above-identified compositions were kneaded in a continuous kneader and dispersed in a sand mill. The resulting dispersion was mixed with 3 parts of polyisocyanate (Colonate L) and 40 parts of butyl acetate. The mixture was passed through a filter having a mean pore size of 1 μm, to give a coating dispersion for preparing a magnetic recording layer.

3) Coating solution for preparing subbing layer 2 parts of each resin shown below in Table 1 and 100 parts of cyclohexanone (solvent) were mixed by means of a paddle mixer for 1 hours, to give each of the coating solutions (a) to (g) for preparing a subbing layer.

TABLE 1

| resin | molecular weight | polar group (content: mmol/g) | glass transition point (Tg) |
|---|---|---|---|
| (a) polyester-1 | 50,000 | —$SO_3Na$ (0.2) | 73° C. |
| (b) polyester-2 | 53,000 | —$SO_3Na$ (0.2) | 62° C. |
| (c) polyester-3 | 48,000 | —$SO_3Na$ (0.2) | 45° C. |
| (d) polyester-4 | 54,000 | —$SO_3Na$ (0.2) | 91° C. |
| (e) polyester-5 | 49,000 | —$SO_3Na$ (0.2) | 30° C. |
| (f) polyurethane | 45,000 | —COONa (0.2) | 70° C. |
| (g) polyester-6 | 50,000 | absent | 28° C. |

Remarks:
(1) Each of polyesters-1 to -5 was derived from ethyl ene glycol (EG), diethylene glycol (DEG), terephthalic acid (TP), and isophthalic acid (IP).
(2) Polyester-6 was commercially available from Fuji Photo Film Co., Ltd. (STAFIX [trade name]).
(3) Polyurethane of (f) was derived from ethylene glycol (EG), tetraethylene glycol (TEG), and diphenylmethane-4,4'-diisocyanate (MDI).

4) Coating dispersion for preparing back-coating layer

| | |
|---|---|
| Carbon black I (BLACK PEARLS-800, available from Cabot Corp., mean particle size: 17 mμ) | 100 parts |
| Carbon black II (Thermal Black, available from Cancarb Corp., mean particle size: 270 mμ) | 10 parts |
| Inorganic material powder I (calcium carbonate, available from Shiraishi Industries Co., Ltd., mean particle size: 40 mμ, Mohs' scale of hardness: 3.0) | 80 parts |
| Inorganic material powder II (α-alumina, HIT 55 [trade name], available from Sumitomo Chemical Co., Ltd., mean particle size: 200 mμ, Mohs' scale of hardness: 8.5) | 5 parts |
| Nitrocellulose | 140 parts |
| Polyurethane resin (NIPPORAN 2301 [trade name], available from Nippon Polyurethane Industries Co., Ltd.) | 15 parts |
| Polyisocyanate (MDI) | 40 parts |
| Polyester resin (EG/DEG/TP/IP, molecular weight: 50,000) | 5 parts |
| Dispersant: copper oleate | 5 parts |
| copper phthalocyanine | 5 parts |
| barium sulfate | 5 parts |
| Methyl ethyl ketone | 2,200 parts |
| Butyl acetate | 300 parts |
| Toluene | 600 parts |

All ingredients of the above-identified compositions were kneaded in a continuous kneader and dispersed in a sand mill. The mixture was passed through a filter having a mean pore size of 1 μm, to give a coating dispersion for preparing a back-coating later.

5) Preparation of magnetic recording tape

The above-mentioned coating dispersion for magnetic recording layer and that for non-magnetic undercoating layer were applied on a continuous aromatic polyamide (aramide) support web (MICTORON [trade name], available from Toray Industries Inc., thickness: 4.4 μm) by a simultaneous double coating method, to give a magnetic recording layer having a thickness of 0.2 μm (in terms of thickness after dryness) and a non-magnetic undercoating layer having a thickness of 1.7 μm (in terms of thickness after dryness).

The applied layers were treated successively with a cobalt magnet having a magnetic flux density of 3,000 gauss and a solenoid having a magnetic, flux density of 1,500 gauss for orientation while the layers were still wet. Thus treated layers were dried to give a non-magnetic undercoating layer and a magnetic recording layer placed thereon.

The above-mentioned coating solution (a) for subbing layer and the above-mentioned coating dispersion for back-coating layer were applied on the surface of the support opposite to the surface on which the non-magnetic undercoating layer and the magnetic recording layer were provided, to give a subbing layer having a thickness of 0.1 μm (in terms of thickness after dryness) and a back-coating layer having a thickness of 0.5 μm (in terms of thickness after dryness). Thus, a continuous magnetic recording sheet was produced.

The continuous magnetic recording sheet was then subjected to calendaring (temperature: 85° C., linear pressure 300 kg/cm²) using a calendaring machine comprising seven metal rollers only. The calendared recording sheet was slit to give a magnetic recording tape having a width of 3.8 mm. After that, the tape was subjected to razor blade treatment (i.e., surface smoothing treatment) in which a blade of razor was moved longitudinally in contact with the magnetic recording layer surface of the tape tensed with 100 g/3.8 mm.

The magnetic recording tape was encased in a DDS cartridge, viz.4 mm data cartridge (tape length: 125 m).

EXAMPLES 2 to 4

The procedures of Example 1 were repeated except for replacing the coating solution (a) for a subbing layer with the coating solution (b), (c) or (f) for a subbing layer, to produce a magnetic recording tape of Example 2, 3 or 4, respectively.

EXAMPLE 5

The procedures of Example 1 were repeated except for changing the amounts of the binder components for a back-coating layer in the following manner, to produce a magnetic recording tape of Example 5.

| | |
|---|---|
| Nitrocellulose | 115 parts |
| Polyurethane resin (NIPPORAN 2301 [trade name], available from Nippon Polyurethane Industries Co., Ltd.) | 12.4 parts |
| Polyisocyanate (MDI) | 33 parts |
| Polyester resin (EG/DEG/TP/IP, molecular weight: 50,000) | 4 parts |

EXAMPLE 6

The procedures of Example 1 were repeated except for replacing nitrocellulose for a back-coating layer with the same amount of phenoxy resin (PKHH [trade name], available from Union Carbide Corp.), to produce a magnetic recording tape of Example 6.

EXAMPLE 7

The procedures of Example 1 were repeated except for changing the amounts of the binder components and the solvent for a back-coating layer in the following manner, to produce a magnetic recording tape of Example 7.

| | |
|---|---|
| Nitrocellulose | 273 parts |
| Polyurethane resin (NIPPORAN 2301 [trade name], available from Nippon Polyurethane Industries Co., Ltd.) | 29.3 parts |
| Polyisocyanate (MDI) | 78 parts |
| Polyester resin (EG/DEG/TP/IP, molecular weight: 50,000) | 9.5 parts |
| Methyl ethyl ketone | 4,000 parts |
| Butyl acetate | 550 parts |
| Toluene | 1,100 parts |

EXAMPLE 8

The procedures of Example 1 were repeated except for replacing nitrocellulose for a back-coating layer with the same amount of vinyl chloride copolymer having the polar group (—SO$_3$Na, content of —SO$_3$Na group: 0.05 mol %), to produce a magnetic recording tape of Example 8.

COMPARISON EXAMPLES 1 to 3

The procedures of Example 1 were repeated except for replacing the coating solution (a) for a subbing layer with the coating solution (d), (e) or (g) for a subbing layer, to produce a magnetic recording tape of Comparison Example 1, 2 or 3, respectively.

COMPARISON EXAMPLE 4

The procedures of Example 1 were repeated except for changing the amounts of the binder components for a back-coating layer in the following manner, to produce a magnetic recording tape of Comparison Example 4.

| | |
|---|---|
| Nitrocellulose | 108 parts |
| Polyurethane resin (NIPPORAN 2301 [trade name], available from Nippon Polyurethane Industries Co., Ltd.) | 11.5 parts |
| Polyisocyanate (MDI) | 31 parts |
| Polyester resin (EG/DEG/TP/IP, molecular weight: 50,000) | 3.8 parts |

COMPARISON EXAMPLE 5

The procedures of Example 1 were repeated except for changing the amounts of the binder components and the solvent for a back-coating layer in the following manner, to produce a magnetic recording tape of Comparison Example 5.

| | |
|---|---|
| Nitrocellulose | 308 parts |
| Polyurethane resin (NIPPORAN 2301 [trade name], available from Nippon Polyurethane Industries Co., Ltd.) | 33 parts |
| Polyisocyanate (MDI) | 88 parts |
| Polyester resin (EG/DEG/TP/IP, molecular weight: 50,000) | 11 parts |
| Methyl ethyl ketone | 4,800 parts |
| Butyl acetate | 650 parts |
| Toluene | 1,320 parts |

COMPARISON EXAMPLE 6

The procedures of Example 1 were repeated except for not providing a subbing layer, to produce a magnetic recording tape of Comparison Example 6.

Evaluation of Magnetic Recording Tape (1) Adhesion strength (g/cm) at the interface between the support and the back-coating layer Each sample (width: 3.8 mm) was fixed using a double-sided adhesive tape on a substrate under the condition that the back-coating layer faced the substrate. The fixed sample was bent at 180° angle, and its free edge was drawn by means of a tensile tester. The force detected when the support was separated was recorded to give the adhesion strength (g/cm).

(2) Damage of the back-coating layer

Each sample was made to run 1,000 times through a DDS2 drive (C1533 [trade name], available from Hewlett Packard) under the conditions of 23° C. and 70% RH. After that, the edge of the back-coating layer was observed and evaluated in accordance with Test Model-1 of ECMA standard. According to the observation, the samples were classified into the following grades:

AA: scarcely frayed,
BB: slightly frayed,
CC: notably frayed, and
DD: very severely frayed.

(3) Blocking

With respect to each sample, ten aramide supports (each of which comprises a subbing layer provided on one surface) were piled up in order so that the subbing layer of one support might face the free surface (the surface not covered with a subbing layer) of the next support, and a weight of 100 g was placed on the top support. After the pile was stored at 50° C. for 24 hours, the supports were observed whether they fixed each other. According to the observation, the samples were classified into the following grades:

AA: scarcely fixed to each other,
BB: slightly fixed to each other,
CC: notably fixed to each other, and
DD: very strongly fixed to each other.

(4) Solubility

With respect to each sample, a coating solution for preparing subbing layer (2 wt. %) was prepared using a mixed solvent (cyclohexane/MEK=8/2). After the solution was stored at −5° C. for 24 hours, it was observed whether crystalline resin was deposited.

(5) Coefficient of friction

While the back-coating layer of each sample was pressed with a rod of stainless steel (diameter: 5 mm, surface roughness Ra [cut-off value: 0.8 mm]: 20 nm) at the force of 10 g (T1) at 180° angle, the sample was drawn by means of a tensile tester. The tensile strength detected when the sample was moving (T2) was recorded, and the coefficient of friction ($\mu_k$) was calculated from the values of T1 and T2 in accordance with the formula:

$$\mu_k = (1/\pi) \times ln(T2/T1).$$

The results are shown in Table 2 and Table 3.

TABLE 2

| | subbing layer | | | back-coating layer |
|---|---|---|---|---|
| | coating solution | polar group | Tg (° C.) | ratio of binder/particles |
| Ex.1 | (a) | present | 73 | 1.0 |
| Ex.2 | (b) | present | 62 | 1.0 |
| Ex.3 | (c) | present | 45 | 1.0 |
| Ex.4 | (f) | present | 70 | 1.0 |
| Ex.5 | (a) | present | 73 | 0.82 |
| Ex.6 | (a) | present | 73 | 1.0 |
| Ex.7 | (a) | present | 73 | 1.95 |
| Ex.8 | (a) | present | 73 | 1.0 |
| Com.1 | (d) | present | 91 | 1.0 |
| Com.2 | (e) | present | 30 | 1.0 |
| Com.3 | (g) | none | 28 | 1.0 |
| Com.4 | (a) | present | 73 | 0.77 |
| Com.5 | (a) | present | 73 | 2.2 |
| Com.6 | — | — | — | 1.0 |

TABLE 3

| | solubility | blocking | adhesion (g/cm) | fraying | coefficient of friction |
|---|---|---|---|---|---|
| Ex.1 | AA | AA | 110 | AA | 0.22 |
| Ex.2 | AA | AA | 107 | AA | 0.23 |
| Ex.3 | AA | AA | 95 | AA | 0.22 |
| Ex.4 | AA | AA | 80 | AA | 0.23 |
| Ex.5 | AA | AA | 60 | BB | 0.28 |
| Ex.6 | AA | AA | 110 | AA | 0.21 |
| Ex.7 | AA | AA | 120 | AA | 0.31 |
| Ex.8 | AA | AA | 125 | AA | 0.27 |
| Com.1 | CC | AA | 118 | AA | 0.22 |
| Com.2 | AA | CC | 70 | BB | 0.23 |
| Com.3 | AA | DD | 5 | CC | 0.22 |
| Com.4 | AA | CC | 20 | DD | 0.38 |
| Com.5 | AA | AA | 130 | AA | 0.60 |
| Com.6 | — | — | 3 | DD | 0.53 |

The results set forth in Table 2 and Table 3 indicate the following facts.

The sample according to the invention (each of Examples 1 to 8) has a high adhesion strength between the aramide support and the back-coating layer. It should be noticed for the sample of Example 8 (in which the back-coating layer contains a binder resin having the same polar group as that of the subbing layer has) to have a particularly enhanced adhesion strength. Because of the strong adhesion, the samples of the invention are hardly frayed.

Each coating solution of Examples 1 to 8 has good solubility, and hence is very stable Further, since each sample of Examples has favorable blocking characteristics, it hardly causes blocking troubles during storage or production process in the form of a roll. Furthermore, each sample of the invention comprises the back-coating layer containing a binder and solid fine particles in the particular ratio, and thereby it can stably run without increasing friction.

On the other hand, the samples of Comparison Examples 1 and 2 (each of which has a glass transition point higher than that defined in the invention) have poor solubility and unfavorable blocking characteristics, respectively. Therefore, the coating solution of Comparison Example 1 is unstable and the sample of Comparison Example 2 causes blocking troubles during production process.

The sample of Comparison Example 3 (which has a glass transition point lower than that defined in the invention and which comprises a resin not having polar group) has an extremely weak adhesion strength, and therefore it is notably frayed and exhibits unfavorable blocking characteristics.

Each sample of Comparison Examples 4 and 5 comprises the back-coating layer containing a binder and solid fine particles in a ratio out of the range defined in the present invention, although it is provided with the subbing layer according to the invention. The sample of Comparison Example 4 has an insufficient adhesion strength, and hence it is very severely frayed and the solid fine particles come off to increase friction while the tape is running. The sample of Comparison Example 5 has a high friction coefficient, too.

The sample of Comparison Example 6 (which does not have a subbing layer) has an extremely weak adhesion strength, and therefore it is very severely frayed and has a high friction coefficient.

What is claimed is:

1. A magnetic recording medium-comprising a support of aromatic polyamide, a magnetic recording layer which comprises a ferromagnetic powder and a binder and which is arranged on one surface side of the support, and a back-coating layer which is arranged on the other surface side of the support, wherein
the back-coating layer comprises solid particles and a binder in a particle to binder weight ratio of from 8/10 to 20/10, in terms of the former/latter, and
a subbing layer which comprises polyester resin or polyurethane resin having a glass transition temperature of 40° C. to 80° C. and at least one polar group selected from the group consisting of —$SO_3M$, —$OSO_3M$, —COOM and —$OPO_3MM^1$ in which each of M and $M^1$ independently is a hydrogen atom, an alkaline metal ion or an ammonium ion, is arranged between the support and the back-coating layer.

2. The magnetic recording medium of claim 1, wherein the binder of the back-coating layer comprises at least one resin selected from the group consisting of nitrocellulose resin, polyurethane resin and phenoxy resin.

3. The magnetic recording medium of claim 1, wherein the solid fine particles of the back-coating layer comprises carbon black, a powder of inorganic material having Mohs' scale of hardness of 3 to 4.5, and a powder of inorganic material having Mohs' scale of hardness of 5 to 9.

4. The magnetic recording medium of claim 1, wherein the aromatic polyamide contains the following repeating unit (I) or (II):

  (I)

  (II)

wherein each of $Ar^1$, Ar2 and $Ar^3$ independently represents an aromatic ring (which may be condensed) or a group having at least one aromatic ring.

5. The magnetic recording medium of claim 1, wherein the polyester resin or polyurethane resin of the subbing layer has the polar group in an amount of 0.1 to 3 mmol/g.

6. The magnetic recording medium of claim 1, wherein the polyester resin or polyurethane resin of the subbing layer has a weight average molecular weight of 10,000 to 100,000.

7. The magnetic recording medium of claim 1, wherein the polyester resin or polyurethane resin of the subbing layer has a glass transition temperature of 60° C. to 80° C.

8. The magnetic recording medium of claim 1, wherein the polar group of the polyester resin or polyurethane resin of the subbing layer is —$SO_3Na$ or —COONa.

9. The magnetic recording medium of claim 1, wherein the subbing layer has a thickness in the range of 0.01 to 0.3 μm.

10. A magnetic recording medium comprising a support which comprises aromatic polyamide and has on one surface thereof, in order, an essentially non-magnetic undercoating layer which comprises a non-magnetic powder and a binder and a magnetic recording layer which comprises a ferromagnetic powder and a binder, and on the other surface, in order from said support, a subbing layer which comprises a resin selected from the group consisting of polyester and polyurethane, each of which has a glass transition temperature in the range of 40° C. to 80° C. and has at least one polar group selected from the group consisting of —$SO_3M$, —$OSO_3M$, —COOM and —$OPO_3MM^1$ in which each of M and $M^1$ independently represents a hydrogen atom, an alkaline metal ion or an ammonium ion, and a back-coating layer which comprises solid particles and a binder in a weight ratio of from 8/10 to 20/10 in terms of the former/latter.

11. The magnetic recording medium of claim 10, wherein the polyester resin or polyurethane resin of the subbing layer has the polar group in an amount of 0.1 to 3 mmol/g.

12. The magnetic recording medium of claim 10, wherein the polyester resin or polyurethane resin of the subbing layer has a weight average molecular weight of 10,000 to 100,000.

13. The magnetic recording medium of claim 10, wherein the polyester resin or polyurethane resin of the subbing layer has a glass transition temperature of 60° C. to 80° C.

14. The magnetic recording medium of claim 10, wherein the polar group of the polyester resin or polyurethane resin of the subbing layer is —$SO_3Na$ or —COONa.

15. The magnetic recording medium of claim 10, wherein the subbing layer has a thickness in the range of 0.01 to 0.3 μm.

16. The magnetic recording medium of claim 10, wherein the support has a thickness in the range of 2.0 to 6.0 μm.

17. The magnetic recording medium of claim 16, wherein the subbing layer has a thickness in the range of 0.01 to 0.1 μm.

18. The magnetic recording medium of claim 16, wherein the solid fine particles of the back-coating layer comprises carbon black, a powder of inorganic material having Mohs' scale of hardness of 3 to 4.5, and a powder of inorganic material having Mohs' scale of hardness of 5 to 9.

19. The magnetic recording medium of claim 16, wherein the non-magnetic powder in the non-magnetic undercoating layer is at least one selected from the group consisting of titanium dioxide, α-alumina, α-iron oxide and chromium oxide.

20. The magnetic recording medium of claim 19, wherein the non-magnetic undercoating layer further comprises carbon black.

21. The magnetic recording medium of claim 16, wherein the non-magnetic undercoating layer has a thickness in the range of 0.3 to 2.0 μm.

22. The magnetic recording medium of claim 10, wherein the ferromagnetic powder is a ferromagnetic metal powder.

23. The magnetic recording medium of claim 22, wherein the ferromagnetic metal powder has a length of longitudinal axis in the range of 0.01 to 0.25 μm, a saturation magnetization of 120 to 170 emu/g, and a coercive force of 1,500 to 3,000 Oe.

24. The magnetic recording medium of claim 22, wherein the binder of the magnetic recording layer comprises a combination of a polyurethane resin, a vinyl chloride resin and a polyisocyanate.

25. The magnetic recording medium of claim 24, wherein the polyurethane resin, the vinyl chloride resin and the polyisocyanate are in amounts of 2 to 50 weight parts, 5 to 70 weight parts and 2 to 50 weight parts, respectively, to give 100 weight parts of the binder.

26. The magnetic recording medium of claim 10, wherein the magnetic recording layer further contains a carbon black having a particle size of 5 to 350 mμ.

* * * * *

UNITED STATES PATENT AND TRADEMARK OFFICE
CERTIFICATE OF CORRECTION

PATENT NO. : 6,129,979
DATED : October 10, 2000
INVENTOR(S) : Toshio Kawamata et al.

It is certified that error appears in the above-identified patent and that said Letters Patent is hereby corrected as shown below:

Claim 1,
Line 1, change "medium-comprising" to -- medium comprising --.

Claim 4,
Line 8, change "Ar2" to -- $Ar^2$ --.

Signed and Sealed this

Thirtieth Day of October, 2001

Attest:

NICHOLAS P. GODICI
Attesting Officer  Acting Director of the United States Patent and Trademark Office